Jan. 27, 1970   R. W. G. SOMERVELL ET AL   3,491,444
SCISSORS AND OTHER CUTTING OR SHEARING HAND TOOLS
Filed Feb. 21, 1967   2 Sheets-Sheet 1

INVENTORS:
Roland W. G. Somervell & Nigel P. Kratz,
BY
Wolf, Hubbard, Voit and Osann,
ATTORNEYS.

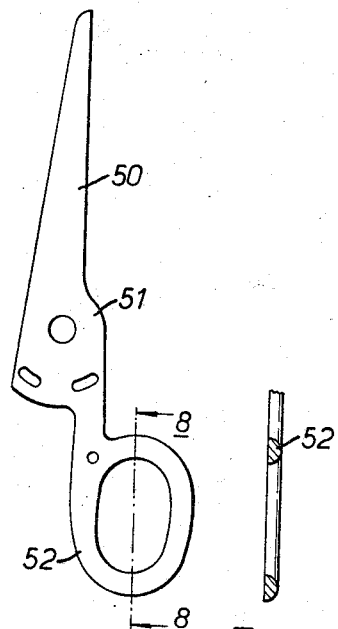 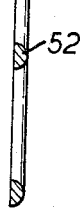 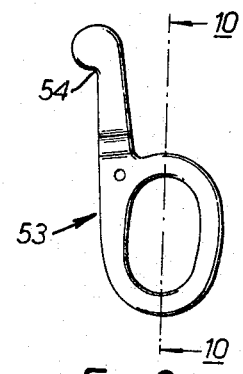 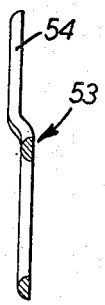
FIG. 7.   FIG. 8.   FIG. 9.   FIG. 10.
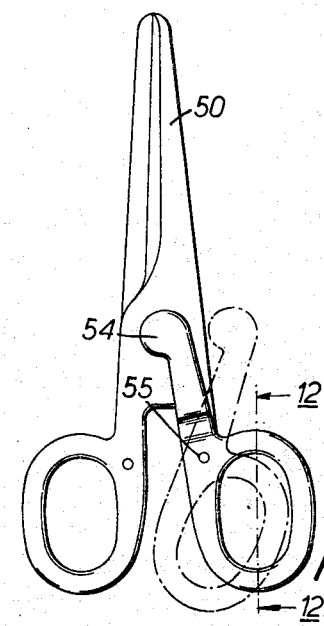 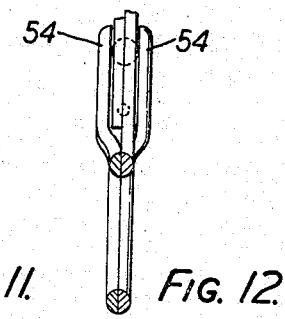
FIG. 11.   FIG. 12.

United States Patent Office 3,491,444
Patented Jan. 27, 1970

3,491,444
SCISSORS AND OTHER CUTTING OR SHEARING HAND TOOLS
Roland W. G. Somervell, Beaconsfield, and Nigel P. Kraty, Burnham, England, assignors to Wilkinson Sword Limited, London, England, a British company
Filed Feb. 21, 1967, Ser. No. 617,568
Claims priority, application Great Britain, Feb. 23, 1966, 7,913/66
Int. Cl. B26b 13/00
U.S. Cl. 30—254                                    1 Claim

ABSTRACT OF THE DISCLOSURE

A pair of scissors is stamped from sheet steel and each handle has a resilient extension which overhangs a pivot ball or roller to confine the latter within apertures in each blade. The blades may be biased towards one another during cutting by the provision of balls confined in slots in the blades at a portion thereof opposite the cutting portions.

---

This invention relates to scissors and to other cutting or shearing hand tools.

It is common experience that cheaply-produced scissors, the blades of which are interconnected by a simple pivot pin or screw, rapidly become inefficient in use because the action of cutting or shearing tends to force the blades apart and the pivot pin wears as a result and therefore becomes ineffective to maintain the blades in correct cutting or shearing relationship. It is therefore desirable to produce cutting or shearing tools, such as scissors, with an effective form of pivotal connection which either does not wear in practice or in which any wear is continually taken up.

According to the present invention, there is provided a hand tool comprising two pivotally-connected elements of stamped out metal having mutually-aligned apertures on the pivot axis, a pivot member in said apertures and a pair of opposed resilient members confining said pivot member within said apertures.

Further according to the present invention, there is provided a hand tool comprising two pivotal members, each pivotal member including a blade portion, a handle portion and an intermediate portion, the respective intermediate portions each having an aperture accommodating a common pivot, a pair of opposed resilient members each rigid with one of said pivotal members and engaging said pivot to apply a force thereto oppose to the force applied by the other resilient member, and means acting between said intermediate portions biassing the blade portions towards one another.

Still further according to the present invention, there is provided a hand tool comprising two pivotal members and means disposed on one side of the pivot axis and acting between parts of said members to bias parts of the members on the other side of the axis towards one another.

Yet further according to the present invention, there is provided a pair of scissors comprising two pivotally connected blade assemblies, each including a blade portion, a handle portion and an intermediate portion, each said intermediate portion having an aperture accommodating a common pivot and each said handle portion having an integral resilient extension overlying and in contact with part of said common pivot thereby confining said pivot substantially in the apertures, a pair of recesses disposed in one said intermediate portion opening in a face thereof opposed to the intermediate portion of the other assembly and two members of circular section each rollable in one said recess and in contact with said intermediate portion of the other assembly, said recesses and circula-section members being so disposed as to continuously bias the blade portions towards one another.

Yet further according to the present invention, there is also provided a method for the manufacture of a scissor blade assembly comprising a blade portion, a handle portion and a resilient extension of the handle portion, said method comprising stamping a blank of the assembly from sheet metal, offsetting said resilient extension out of the plane of the handle and blade portions, and bending said handle portion so that the extension thereof lies on the pivot axis of the assembly.

Two embodiments of scissors in accordance with the invention, will now be described, by way of example, with reference to the accompanying drawings, in which:

FIGURE 7 is a plan view of one blade assembly of a pair of scissors of a second embodiment;

FIGURE 8 is a fragmentary section on the line 8—8 of FIGURE 7;

FIGURE 9 is a plan view of a member forming another part of the handle portion of the blade of FIGURE 7;

FIGURE 10 is a section on the line 10—10 of FIGURE 9;

FIGURE 11 is a plan view of the assembled scissors of the second embodiment; and FIGURE 12 is a section on the line 12—12 of FIGURE 11.

Figure 1:
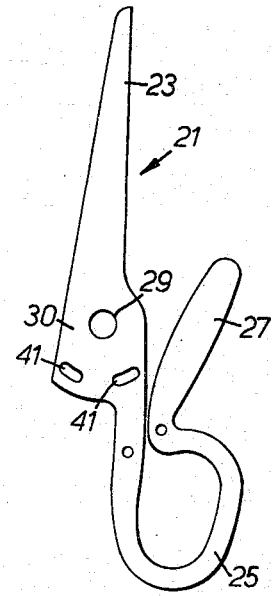
FIGURE 1 is a plan view illustrating one blade assembly of a pair of scissors at a first stage in the manufacturing process of that blade.

Referring now to the drawings, and in particular to FIGURES 1 to 6, the pair of scissors of the first embodiment includes two blade elements or assemblies 20, 21 each having a blade portion 23, 24, a handle portion or finger ring 25, 26 and a resilient extension 27, 28 integral with the finger ring portion 25, 26. As in conventional scissors, the two blade assemblies are pivotally connected, but in place of the conventional pivot or screw, an aperture 29 (only the aperture of assembly 21 being shown) is provided in each intermediate portion 30 of the blade assembly at the pivot point and a ball 31 or roller 32 (shown separately as part of FIGURE 4) is inserted in the aligned apertures and held captive therein by the resilient extension 27, 28, one extension lying at each end of the pivot connection.

Each blade assembly 20, 21 is formed by stamping out sheet steel and hence, initially, the resilient extensions 27, 28, lie in the same plane as the remainder of the respective assembly. In forming the finger ring portion 25, 26 of each member, the extension, 27, 28 is bent to overlie the intermediate portion of the assembly and is slightly offset (see FIGURE 6) so that it is spaced from that portion of the assembly including the pivot aperture by an amount sufficient to permit the presence of the intermediate portion of the other assembly. A rivet 33 or other connection means passing through aligned apertures 34 in the handle portion secures the root of the resilient extension 28 to that part of the ring portion which joins the intermediate portion 30 of the assembly.

Although not indicated in the drawing, the finger ring of each assembly may conveniently be coated with a synthetic-resin in order to improve appearance and render the scissors more comfortable for use by the user. As can best be seen in FIGURE 6, when assembled, the intermediate portions have faces in contact with one another and each resilient extension 27, 28 extends over the outer faces of the intermediate portions 30 of the respective blade assemblies.

Figure 2:
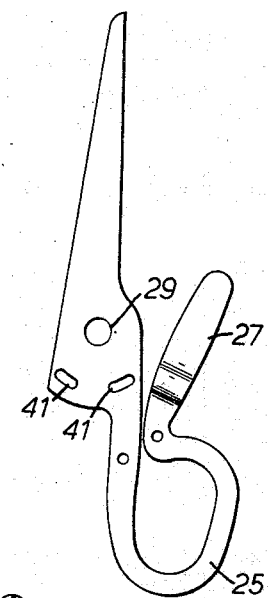
FIGURE 2 is a view similar to FIGURE 1 but showing the blade assembly at a second stage in the manufacturing process.
Figure 3:
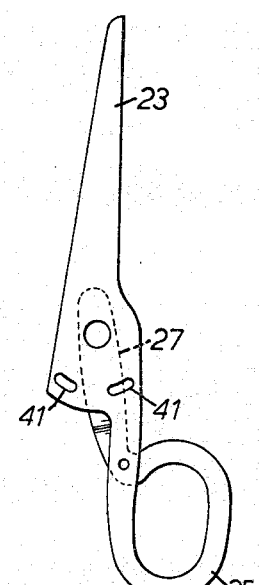
FIGURE 3 is a view again similar to FIGURE 1, but showing the blade assembly at a third stage in the manufacturing process.
Figures 4, 6:
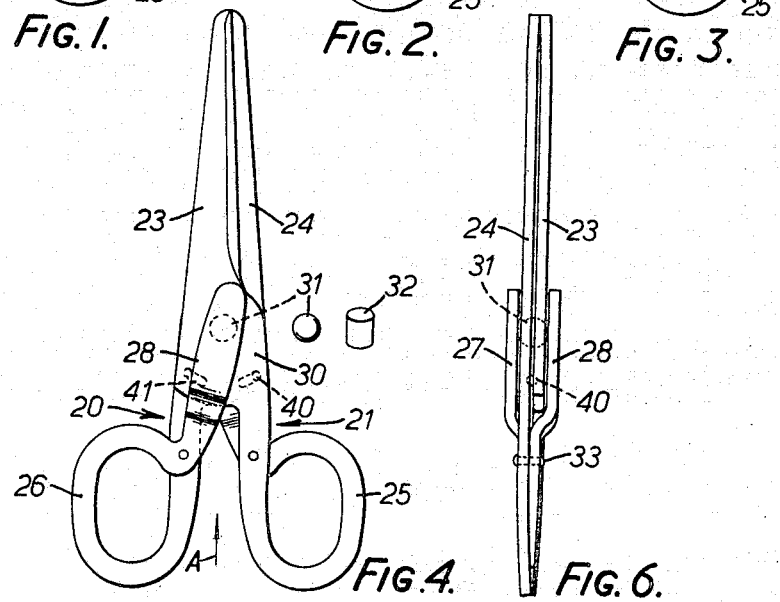
FIGURE 4 is a plan view showing the scissors in an assembled condition.
FIGURE 6 is a side elevation of the assembled scissors of FIGURES 4 and 5.
Figure 5:
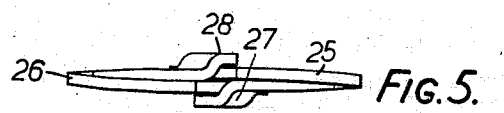
FIGURE 5 is an end view of the scissors of FIGURE 4 as viewed in the direction of the arrow A in FIGURE 4.

The successive steps in the manufacture of one blade assembly are illustrated in FIGURES 1, 2 and 3. In FIGURE 1 the blade assembly is stamped out to form the blade portion 23, the intermediate portion 30, the aperture 29, the finger ring 25, the resilient extension 27 and the rivet apertures. In the processing step shown in the FIGURE 2, the resilient extension 27 is offset so that when bent inwardly over the intermediate portion of the assembly, two apertures in the respective blade assemblies for the accommodation of the rivet 33 are aligned and the resilient extension is spaced by a small distance from the intermediate portion.

The friction generated by the contacting faces of the intermediate portions 30 of each blade assembly may be reduced by the provision of two members of circular section in the form of hard-steel captive balls 40 each engaged in a respective slot or other recess 41 in one of the opposed faces of the intermediate portions 30, and movable along a corresponding arcuate slot, the centre of the arc lying on the pivot axis, in the opposed face of the intermediate portion of the other blade assembly. These balls and slots are disposed at the opposite side of the pivotal connection to the blade portion and thus have the effect of producing a force resisting the force which is generated by the cutting action which tends to force the blades apart. The resiliency of the resilient portions 27, 28 also has the effect of forcing the blades together as well as maintaining the ball or roller in its correct position.

In an alternative, if desired, the rivets 33 of the finger rings can be replaced by adjustable screws (not shown) thus allowing the interblade pressure to be adjusted, according to the nature of the material to be cut.

It is believed that the hereinbefore described embodiment has one or more of the following advantages:

(1) The pivot connection is under compressive forces, not under tensile forces as with conventional scissors.

(2) The provision of the ball and slot arrangement minimises friction.

(3) Inter-blade pressure is maintained by resilient means, rather than by the twisting action required with ordinary scissors.

(4) The three-dimensional use of a flat stamping which provides the natural twist of the finger ring portions, renders the scissors easy to pick up and comfortable in use.

(5) A self-sharpening effect because it is possible to maintain the blades parallel and without set (i.e. initial bending towards one another).

(6) Ease of production and assembly resulting, inter alia, from absence of set and the need for screw adjustment of a pivot member.

(7) The balls and slots act to prevent excessive opening of the blades.

In the second embodiment in accordance with the invention each blade assembly comprises two stampings, but similar parts to those of the first embodiment have been given like reference numerals. As can be seen in FIGURE 7, a main part of each blade assembly includes a blade portion 50, intermediate and finger ring portions 51, 52, and an auxiliary part 53 includes only a finger ring portions and a resilient extension 54. The finger ring portions of the main assembly and auxiliary part are riveted together by a rivet 55, and the assembled finger ring coated with a synthetic-resin, for example, nylon.

Preferably, the ring portions of each stamping are fine-blanked so that one face is radiused, the plane faces being assembled face to face so that the exterior of the finger ring is smoothly rounded. The pivot connection and other parts of the scissors of the second embodiment are similar to those of the first embodiment and will not therefore be further described.

If the auxiliary part (FIGURES 9 and 10) including the resilient extension is made of thinner gauge steel than the main blade assembly, the advantage arises that it can be offset, in the manner illustrated in FIGURE 10, relatively easily, and no bending operation is required for the main blade assembly which can be made, if desired, of heavier gauge metal. The resilient extension may be stamped with a radiused face (see FIGURE 10) and pierced for the reception of a rivet in one operation.

If desired, the auxiliary part 53 can be of a different material from that of the main blade assembly 50.

By use of the construtcion of FIGURES 7 to 12, assembly of the scissors is facilitated by riveting the ring portion of the main blade assembly to that of the auxiliary part with the ring portions non-aligned and subsequently pivoting the portions and engaging the resilient extension 54 over the pivot ball or roller. Subsequently to this pivoting action it is possible to hold the two portions of the finger ring together in order to form the completed finger ring simply by dipping in a synthetic-resin, which has the additional advantage of providing pleasing appearance and a smooth feel.

If desired the balls and arcuate slots in which they move can be omitted and hence the middle portions of the blade assemblies can be correspondingly reduced in longitudinal extent.

In a further embodiment, only one resilient extension is provided and only one of the blades has an aperture accommodating a single ball bearing, which ball is retained in the aperture by a resilient extension extending from the other handle. The other blade may have a shallow recess which accommodates parts of the ball, but this is not essential. Effectively therefore, the first-mentioned blade is retained between two limbs of the second-mentioned blade assembly, although one of these limbs is substantially shorter than the other. The handle or finger ring of the one blade may be conventional and the handle of the other blade be open in the manner of a two pronged claw. One prong may be longer than the other and both claws may curve towards one another. The two limbs of the second-mentioned blade assembly may be non-integral and may be secured together by rivets.

In one modification of the last-described embodiment the ball is replaced by a pivot pin having an integral shoulder so disposed that one end of the pin fits in an aperture of the shorter limb of the second-mentioned blade assembly whilst the other end fits in both an aligned aperture in the said one blade and an aperture in the longer limb of the second-mentioned blade assembly, that is the limb integral with the blade per se. The shoulder of the pin acts as a spacer between the shorter limb of the second-mentioned blade and the first blade.

In a second modification of the last-described embodiment the construction is similar to the last-mentioned modification thereof, but the shoulder of the pivot pin is a free fit on the body of the pin.

In a third modification of the last-described embodiment, the construction is again generally similar to the first-described modification thereof, but the end of pivot pin engaged in the shorter limb of the second-mentioned blade assembly is screw-threaded and the corresponding aperture is also screw-threaded, thus enabling the force exerted by the limb on the pin to be adjusted.

In a fourth modification of the last-described embodiment, the construction is again generally similar to the first-described modification thereof, but the pivot pin is replaced by a single adjusting cheese-headed screw which engages in a screw-threaded aperture in the said one blade. The head is accommodated in an aperture in the longer limb of the second-mentioned blade assembly and the end of the screw remote from the head abuts against the inner face of the shorter limb or resilient extension of the second-mentioned blade assembly.

In a still further embodiment the resilient extension is omitted and the pivot pin of the scissor take the form of a rivet with a spring washer engaged between one exposed head thereof and one of the blades.

We claim:
1. A pivot action hand tool comprising
   two pivotally-interconnected members each including
      a blade portion,
      a handle portion,
      an intermediate portion interconnecting the blade and handle portions and having an aperture on the pivot axis, and a pair of arcuate recesses in the surface thereof between the pivot axis and the handle portion,
      a resilient extension portion of the handle portion, a free end part of which lies on the pivot axis of the tool and another part of which is offset so that the free end overlies the intermediate portion of the other pivotal members,
   a pivot assembly comprising,
      a ball engaged in opposed said apertures in the intermediate portions and held therein by the free end parts of the resilient extensions, and
   means biasing the blade portions together in a direction parallel to the pivot axis, said means including,
      said pairs of arcuate recesses in the intermediate portions of the pivotal members, and
      two hard steel balls arranged to roll in respective said recesses.

References Cited

UNITED STATES PATENTS

| | | | |
|---|---|---|---|
| 785,934 | 3/1905 | Border | 30—268 X |
| 1,566,649 | 12/1925 | Carlson | 30—267 X |
| 2,372,242 | 3/1945 | Wilson | 30—267 |

FOREIGN PATENTS

| | | |
|---|---|---|
| 50,808 | 2/1890 | Germany. |
| 12,148 | 6/1891 | Great Britain. |

ROBERT C. RIORDON, Primary Examiner

J. C. PETERS, Assistant Examiner

U.S. Cl. X.R.

30—268